Jan. 2, 1923.
R. H. BERKLEY.
MACHINE FOR CUTTING LINK MESH.
FILED JUNE 8, 1921.
1,440,762.
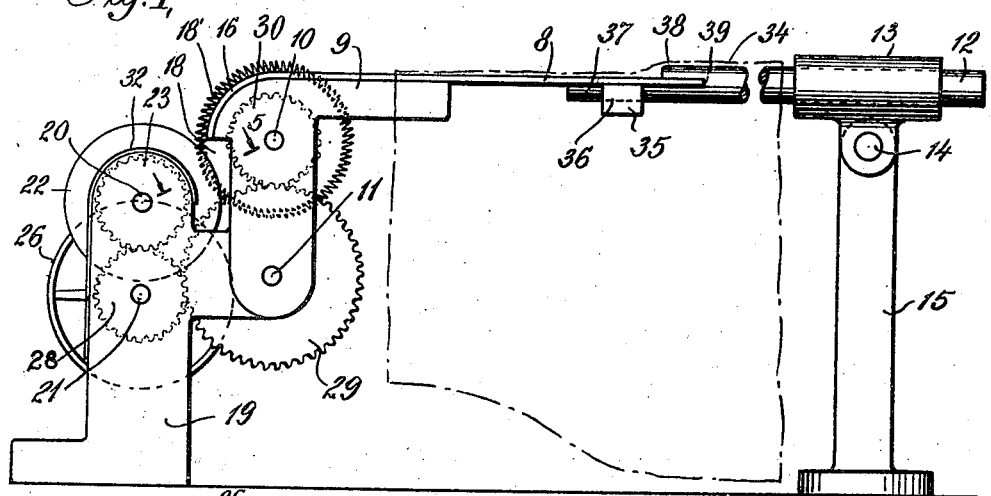
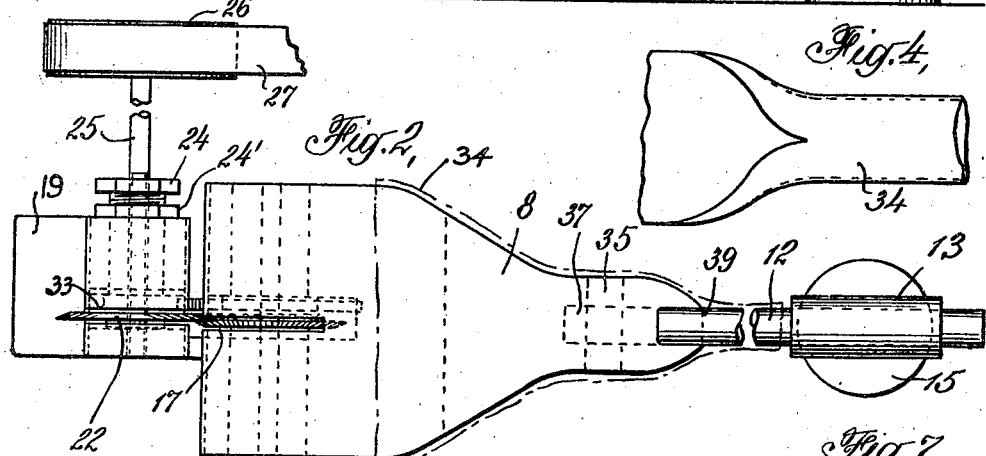
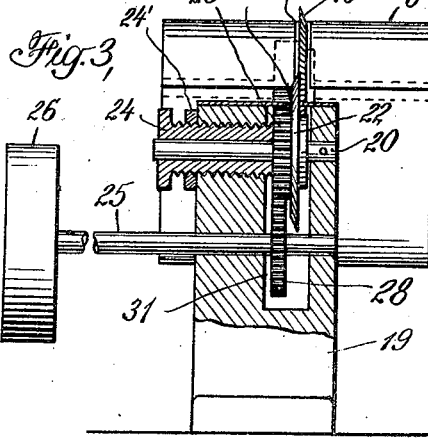
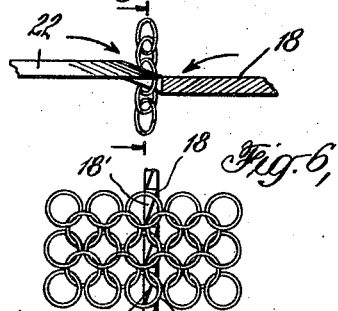
Inventor
Richard H. Berkley
By his Attorneys
Pennie, Davis, Marvin & Edmonds Patented Jan. 2, 1923.

1,440,762

UNITED STATES PATENT OFFICE.

RICHARD HATLEY BERKLEY, OF PLAINVILLE, MASSACHUSETTS, ASSIGNOR TO WHITING & DAVIS COMPANY, A CORPORATION OF MASSACHUSETTS.

MACHINE FOR CUTTING LINK MESH.

Application filed June 8, 1921. Serial No. 475,901.

*To all whom it may concern:*

Be it known that I, RICHARD H. BERKLEY, a citizen of the United States, residing at Plainville, in the county of Norfolk, State of Massachusetts, have invented certain new and useful Improvements in Machines for Cutting Link Mesh; and I do hereby declare the following to be a full, clear, and exact description of the invention, such as will enable others skilled in the art to which it appertains to make and use the same.

This invention relates to machines for cutting link mesh fabric and is directed particularly to the provision of a machine of simple construction, adapted for convenient operation and arranged to cut a piece of link mesh fabric along the line of one of the rows of links of the fabric.

A machine constructed in accordance with the invention consists of a support for the fabric to be cut, a cutter which may be in the form of a rotary saw and a means for feeding the fabric progressively over the surface of the support to carry the rings of one row of the fabric successively into engagement with the cutter.

In accordance with this invention, the feeding means is arranged to engage the rings of the row which is to be engaged by the cutter. Link mesh fabric such as that used extensively in the jewelry trade, and particularly fabric of the finer quality having rings of small size, is comparatively fragile and the rings of the fabric must not be subjected to any substantial strain. Such a strain might damage some of the links and substantial damage might be occasioned even though it did not open the rings enough to make the damage readily noticeable. The danger of so damaging the fabric is practically eliminated by so constructing the machine as to cause the feeding devices to engage the rings of the row which is to be cut, for damage to those rings effected by the feeding devices is inconsequential. Thus, the feeding means may consist of a single toothed wheel arranged adjacent to and in substantially the same plane with the rotary cutter or saw so that it will feed the fabric to the cutter in position for the cutter to engage the links which were engaged by the toothed feeding wheel. Preferably the teeth of the feeding wheel are spaced apart to correspond with the spacing of the links of the mesh being cut.

The invention is preferably embodied in a machine for cutting mesh in the form of a sleeve such as that produced by mesh-making machines of the type illustrated and described in Letters Patent Nos. 948,615 and 1,144,724 issued February 8, 1910 and June 29, 1915 respectively to A. C. Pratt.

The invention is illustrated in the accompanying drawings in application, as an example, to a machine for cutting open a sleeve of link mesh, in which, Figure 1 is a side view in elevation of the machine;

Figure 2 is a plan view of the machine;

Figure 3 is an end view partly in section;

Figure 4 represents a sleeve of link mesh partly cut open;

Figure 5 is a view along the line 5—5 of Figure 1;

Figure 6 represents a portion of the link mesh fabric showing the feed wheel with its teeth in engagement with a row of links of the fabric, and Figure 7 illustrates a segment of the feed wheel showing the peripheral teeth of the wheel on an enlarged scale.

The machine has a table 8 depending from one end of which is a frame 9 providing bearings for the shafts 10 and 11. The opposite end of the table is disengageably connected to a rod 12 which passes through a support 13 pivoted at 14 on a standard 15. The end of the table 8, adjacent the frame 9, is curved downwardly as at 16 and is provided with a slot 17 through which the teeth 18' of the feed wheel 18 project. The frame 9 is supported on a standard 19 in which the shafts 20 and 21 are journaled. Loosely mounted on the shaft 20 is a circular knife 22, and on the same shaft, adjacent to the knife 22, is a gear 23 which is keyed to the shaft to permit a small amount of lateral movement. The knife 22 has a driving connection with the gear 23 by means, for example, of pins or studs projecting outwardly from the knife and adapted to enter holes, not shown, for their reception in the gear 23. The circular knife 22 and the feed wheel 18 are mounted so that their peripheries overlap and the shaft 20 is provided with a bushing 24 threaded in the frame 19 which bears against one side of the gear 23 and by which the knife may be tightened against the feed wheel 18. A lock nut 24' is provided for securing the bushing in adjusted position. The cutting and feeding mechanisms of the machine are driven from a power shaft 25 having at one end a pulley 26, which may be connected by means of a belt 27 to a source of power. Mounted on shaft 25 is a gear 28 which meshes with the gear 23 for rotating the circular knife 22, and with an intermediate gear 29 in mesh with the gear 30, on shaft 10, for driving the feed wheel 18. The standard 19 is recessed as shown at 31 to accommodate the gearing 19—28, and the covering strip 32 therefor is slotted at 33 to permit the circular knife 22 to project outwardly with its periphery overlapping the feed wheel 18.

The sleeve of link mesh fabric 34 can be placed in position on the table 8 only by disconnecting the table from the rod 12. The rod 12 is, therefore, slidably mounted in the support 13 so that it can readily be pulled backwardly to disengage it from the table. The connecting means between the table and the rod consist of a lug 35 depending from the table and having an opening 36 through which the reduced end 37 of the rod 13 is adapted to project. The end 38 of the rod has a slot 39 for receiving the end of the table.

The operation of the machine is as follows:—

The rod 12 is first disengaged from the table 8 by drawing it backwardly and is then tilted upwardly about the pivot 14 to an inclined position. A sleeve of link mesh is then placed over the end of the rod after which the latter is again connected with the table 8. The sleeve of link mesh, represented as at 34, is now drawn forwardly on the table by the operator and is spread over the enlarged portion thereof and brought in engagement with the teeth 18′ of the feed wheel 18. The teeth 18′ which are inclined backwardly or opposite to the direction of rotation of the feed wheel 18, engage the links of a single row, as the row A in Figure 6, and feed these links over the downwardly curved portion 16 of the table against the circular knife 22, as shown in Figure 5. As the links are brought in engagement with the knife one after another, they are subjected to the shearing action between the knife 22 and the feed wheel 18, and are severed along a single row until the sleeve of mesh fabric is cut open.

I claim:

1. In a machine for cutting link mesh, means for cutting a piece of link mesh fabric along the line of one row of links, and means for engaging the links of the same row to feed said links to the cutting means to be severed.

2. In a machine for cutting link mesh, a support for a piece of link mesh fabric, a cutter, mechanism for actuating the cutter, and means cooperating with the support for engaging a row of links of the fabric to feed the links of said row to the cutter to be severed.

3. In a machine for cutting link mesh, a support for a piece of link mesh fabric, a rotary cutter, mechanism for driving the cutter, and means cooperating with the support for engaging a row of links of the fabric to feed the links of said row to the cutter to be severed.

4. In a machine for cutting link mesh, a support for a piece of link mesh fabric, a cutter, mechanism for driving the cutter, and means cooperating with the support and overlapping the cutter for engaging a row of links to feed the links of said row against the cutter to shear the links.

5. In a machine of the character described, a support for a sleeve of link mesh fabric, a circular knife, mechanism for driving the knife, and means, consisting of a wheel having peripheral teeth, overlapping the knife blade, for engaging the links of a row, to feed the links of said row to the knife blade to shear the links.

In testimony whereof I affix my signature.

RICHARD HATLEY BERKLEY.